United States Patent
Liu et al.

(10) Patent No.: US 9,794,013 B2
(45) Date of Patent: Oct. 17, 2017

(54) UPLINK INTERFERENCE MANAGEMENT IN TIME DIVISION DUPLEX (TDD) NETWORK SYSTEMS

(71) Applicant: Telefonaktiebolaget LM Ericsson (publ), Stockholm (SE)

(72) Inventors: Ping Liu, Ottawa (CA); Edwin Iun, Ottawa (CA); Mihai Parvan, Ottawa (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 240 days.

(21) Appl. No.: 14/422,870

(22) PCT Filed: Dec. 24, 2014

(86) PCT No.: PCT/IB2014/067317
§ 371 (c)(1),
(2) Date: Feb. 20, 2015

(87) PCT Pub. No.: WO2016/103009
PCT Pub. Date: Jun. 30, 2016

(65) Prior Publication Data
US 2016/0191186 A1    Jun. 30, 2016

(51) Int. Cl.
*H04J 3/00*      (2006.01)
*H04L 5/14*      (2006.01)
(Continued)

(52) U.S. Cl.
CPC ........ *H04J 11/0056* (2013.01); *H04L 5/0073* (2013.01); *H04L 5/14* (2013.01); *H04W 24/10* (2013.01); *H04W 56/001* (2013.01)

(58) Field of Classification Search
CPC ...... H04J 11/0056; H04L 5/14; H04L 5/0073; H04W 24/10; H04W 56/001
See application file for complete search history.

(56) References Cited

U.S. PATENT DOCUMENTS

| | | | |
|---|---|---|---|
| 2009/0135748 A1 | 5/2009 | Lindoff et al. | |
| 2011/0170424 A1* | 7/2011 | Safavi | H04L 43/0811 370/242 |

(Continued)

FOREIGN PATENT DOCUMENTS

WO    2014107122 A1    7/2014

OTHER PUBLICATIONS

International Search Report and Written Opinion dated Aug. 25, 2015 for International Application Serial No. PCT/IB2014/067317, International Filing Date—Dec. 24, 2014 consisting of 12-pages.

(Continued)

*Primary Examiner* — Kiet Tang
(74) *Attorney, Agent, or Firm* — Christopher & Weisberg, P.A.

(57) ABSTRACT

A system is provided. The system includes a plurality of network nodes for operating in a Time Division Duplex, TDD, network. The plurality of network nodes includes at least a network node and a first neighbor network node. The network node includes a node processor and node memory. The node memory contains instructions executable by the node processor. The first network node is configured to detect interference caused by the first neighbor network node in at least one uplink, UL, subframe, and determine a potential reason for the interference caused by the first neighbor network node.

50 Claims, 13 Drawing Sheets

(51) Int. Cl.
     *H04W 4/00*      (2009.01)
     *H04L 12/26*     (2006.01)
     *H04J 11/00*     (2006.01)
     *H04W 56/00*    (2009.01)
     *H04W 24/10*    (2009.01)
     *H04L 5/00*      (2006.01)

(56) References Cited

U.S. PATENT DOCUMENTS

| | | | |
|---|---|---|---|
| 2011/0292895 A1* | 12/2011 | Wager | H04L 5/0007 370/329 |
| 2013/0195013 A1 | 8/2013 | Ahn et al. | |
| 2013/0235759 A1 | 9/2013 | Meshkati et al. | |
| 2013/0301570 A1 | 11/2013 | Xu et al. | |
| 2014/0140295 A1 | 5/2014 | Manssour | |
| 2015/0003272 A1* | 1/2015 | Hu | H04L 5/14 370/252 |

OTHER PUBLICATIONS

3GPP_TS_36_211_V10.4.0 (Dec. 2011) 3rd Generation Partnership Project; Technical Specification Group Radio Access Network; Evolved Universal Terrestrial Radio Access (E-UTRA); Physical Channels and Modulation (Release 10) dated Dec. 22, 2011 consisting of 101-pages.

Symmetricom White Paper, "Timing and Synchronization for LTE-TDD and LTE-Advanced Mobile Networks" dated Aug. 3, 2013 consisting of 9-pages.

PCT Notification of Transmittal of International Preliminary Report on Patentability, Form/PCT/IPEA/416, dated Dec. 15, 2016 for corresponding International Application No. PCT/IB2014/067317, International Filing Date—Dec. 24, 2014 consisting of 41-pages.

* cited by examiner

| Uplink-Downlink Configuration | Downlink-to-Uplink Switchpoint Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 5

| Uplink-Downlink Configuration of Network Node 42a / TDD Mode Configuration | Uplink-Downlink Configuration of Network Node 42n | | | | | | |
|---|---|---|---|---|---|---|---|
| | 0 | 1 | 2 | 3 | 4 | 5 | 6 |
| 0 | | 4 & 9 | 3,4,8 & 9 | 6,7,8 & 9 | 4,6,7,8 & 9 | 3,4,6,7,8 & 9 | 9 |
| 1 | NA | NA | 3 & 8 | 6,7 & 8 | 6,7 & 8 | 3,6,7 & 8 | NA |
| 2 | NA | NA | | 6 & 7 | 6 & 7 | 6 & 7 | NA |
| 3 | NA | 4 | 3 & 4 | | 4 | 3 & 4 | NA |
| 4 | NA | NA | 3 | NA | | 3 | NA |
| 5 | NA | NA | NA | NA | NA | | NA |
| 6 | NA | 4 | 3,4 & 8 | 6,7 & 8 | 4,6,7 & 8 | 3,4,6,7 & 8 | |

FIG. 7

UPLINK INTERFERENCE MANAGEMENT IN TIME DIVISION DUPLEX (TDD) NETWORK SYSTEMS

FIELD

The present disclosure relates to wireless communication and in particular to a method, network node and system for identifying a potential reason and root cause of uplink (UL) interference among network nodes based at least in part on a determined UL interference pattern or signature associated with the UL interference, and for auto-correction of the potential reason and/or root cause of the UL interference.

BACKGROUND

The demands on wireless Long Term Evolution (LTE) and LTE advanced networks (referred to generally herein as "LTE networks") continue to increase due to subscriber demand. In order to keep up with the demand, operators have continued deploying Frequency Division Duplex (FDD) LTE and/or Time Division Duplex (TDD) LTE networks. While FDD LTE networks are more widely implemented than TDD LTE, TDD LTE has been gaining momentum due in part to its flexibility in not requiring a paired wireless communication spectrum, among other advantages. For example, FDD LTE relies on a paired spectrum for operation, one for uplink and the other for downlink.

However, in TDD LTE, the downlink (DL) and uplink (UL) are on the same frequency in which separation occurs in the time domain; thereby separating transmission direction at the subframe level. The UL/DL duplexing is described in detail with respect to 3GPP specification Technical Specification (TS) 36.211 on a time-slicing schedule, illustrated in Table 1 below.

TABLE 1

| Uplink-Downlink Con-figuration | Downlink-to-Uplink Switchpoint Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

The network operator selects the UL/DL (TDD Mode) configuration, e.g., 0 to 6, and applies the selected TDD mode to all eNBs and User Equipments (UEs) in a geographic region. Referring to Table 1, "D" denotes the subframe allocation for the downlink, "U" refers to the subframe allocation for the uplink, e.g., UL time slice, and "S" denotes a special frame. The TDD Mode is typically stored and configured in the baseband unit, and is sent to UEs on the DL control channel for implementation.

A system view of a portion of an existing LTE TDD system 10 is shown in FIG. 1. System 10 includes one or more evolved Node Basestations (eNBs) 12 and one or more user equipments 14 in communication with the one or more eNBs 12 using LTE TDD standards as are known in the art. In particular, eNB 12 includes baseband unit 16 that implements baseband processing functionality such as signal processing, time switching configuration, among other functions known in the art in accordance with LTE TDD standards. Further, eNB12 includes radio unit 18 in communication with baseband unit 16 for performing radio signal based functions such as receiving/transmitting data. In particular, radio unit 18 consists of subsystems including transmitter 20, receiver 22, switch 24, time switch control 26 for transmitting/receiving signals according to LTE TDD standards as are known in the art. Time switch control 26 operates switch 24 according to the time switching configuration stores in baseband unit 16. Radio unit 18 includes radio processing unit 28 for communicating baseband data to/from baseband unit 16 and processing radio frequency signals. UE 14 includes receiver 30, transmitter 32, switch 34 and time switch control 36 for receiving/transmitting signals. UE 14 further includes processing unit for processing receiving signals and signals to be transmitted to eNBs 12.

However, TDD LTE is not without issues. In particular, TDD uplink (UL) interference becomes a severe problem when base stations, i.e., evolved Node Base stations (eNBs) deployments are more condensed within an operator's network and among other networks. During the subframe allocated for the uplink, "U", subframe, eNB 12 listens for RF signals from intended UEs only. Any interference signal, i.e., signal from other than intended UEs, may become severe noise and degrade network performance. This UL interference signal has become stronger than before because of the close proximity of the eNBs in which the UL interference dramatically degrades TDD data throughput. The UL interference most often occurs when telecommunications equipment malfunctions, when the TDD network is out of synchronization due to TDD modem misconfiguration, or due to timing reference problems.

Existing solutions only go as far as UL interference detection. For example, the UL interference due to neighbor eNB transmission signal leakage is detected by an eNB. In response, the eNB typically shuts down the impacted hardware receiver path for circuit protection and reports the problem to the network management entity. No root cause identification is even attempted by the eNB.

Another existing approach to the problem of UL interference deals with UL interference at the eNB level. This approach is based on the fact that under interference, the throughput performance suffers. This statistical detection relies on the collection of performance information and/or data metrics at the UL path such as carrier to interference plus noise ratio. However, since TDD data throughput performance degradation may be caused by many factors, this approach cannot help identify root causes of the UL interference.

In other words, the current solutions/approaches are able to detect some UL interference events but they fail to determine the cause of the UL interference, thereby leading to a low throughput system with varying recovery times. The negative impacts on revenue and customer satisfaction can be substantial. While performance data can be collected and analyzes offline through the use of proprietary algorithms to try to identify the nature of the UL interference, such a process is time consuming and requires numerous resources.

SUMMARY

The present disclosure advantageously provides a method, network node and system for identifying a potential reason and root cause of uplink (UL) interference among network nodes based at least in part on a determined UL interference pattern or signature associated with the UL interference. In particular, the present disclosure takes advantage of embedded information in the UL interference pattern or signature itself to diagnose the problem for quicker troubleshooting. The present disclosure provides a real time identification of UL interference in a matter of a few radio frames. This is in the order of tens of milliseconds. Further, the present disclosure provides a new way to study the interference pattern(s) at the radio frame level for subsequently allowing the root cause, i.e., time misalignment or TDD mode misconfiguration, to be isolated. Further, the present disclosure provides automated self-correction in that a network node, e.g., eNB, and/or network management system are able to apply a self-correction automatically based on the identified root cause of the UL interference. Further, the method and system do not rely on UE throughput analysis, but rather use UL interference pattern determination, thereby allowing for a faster determination of the potential reason and root cause of the detected interference.

According to one embodiment of this disclosure, a network node for a Time Division Duplex, TDD, network is provided. The network node includes a processor and a memory in which the memory contains instructions executable by the processor. The network node configured to detect interference caused by a first neighbor network node in at least one uplink, UL, subframe, and determine a potential reason for the interference caused by the first neighbor network node.

According to one aspect of this embodiment, the detected interference is downlink, DL, signal based interference caused by the first neighbor network node. According to another aspect of this embodiment, the detected interference corresponds to an interference pattern occurring within a plurality of UL subframes, and the determining of the potential reason for the interference caused by the neighbor network node includes determining the interference pattern matches one of a plurality of predefined interference patterns. According to another aspect of this embodiment, the determined potential reason for the interference is a time misalignment between the network node and the first neighbor network node.

According to another aspect of this embodiment, the network node is in communication with a plurality of neighbor network nodes including the first neighbor network node. The memory contains further instructions executable by the processor. The network node is configured to receive interference information from the plurality of neighbor network nodes and determine a root cause of the detected interference to be time misalignment and one of the network node and one of the plurality of neighbor network nodes that is associated with the root cause of the detected interference based on the received interference information and the determined potential reason for the interference caused by the first neighbor network node.

According to another aspect of this embodiment, the memory further contains instructions executable by the processor. The network node is configured to determine a corrective action to address the determined root cause of the detected interference due to time misalignment, one of perform the corrective action and instruct the determined one of the plurality of neighbor network nodes that are associated with the root cause of the detected interference to perform the determined corrective action. According to another aspect of this embodiment, the detected interference corresponds to an interference pattern occurring in a plurality of UL subframes. The determination of the potential reason for the interference caused by the first neighbor network node includes determining the interference pattern does not match one of a plurality of predefined interference patterns, and determining the detected interference occurs at least in a predefined subframe of the plurality of UL subframes.

According to another aspect of this embodiment, the determined potential reason for the interference is a time misalignment between the network node and the first neighbor network node. According to another aspect of this embodiment, the network node is in communication with a plurality of neighbor network nodes including the first neighbor network node. The memory further contains instructions executable by the processor. The network node is configured to receive interference information from the plurality of neighbor network nodes, and determine a root cause of the detected interference to be time misalignment and one of the network node and one of the plurality of neighbor network nodes that is associated with the root cause of the detected interference based on the received interference information and the determined potential reason for the interference caused by the first neighbor network node.

According to another aspect of this embodiment, the memory further contains instructions executable by the processor. The network node is configured to determine a corrective action to address the determined root cause of the detected interference due to time misalignment, and one of perform the corrective action and instruct the determined one of the plurality of neighbor network nodes that is the root cause of the detected interference to perform the determined corrective action. According to another aspect of this embodiment, the detected interference corresponds to an interference pattern that occurs within a plurality of UL subframes. The determining of the potential reason for the interference caused by the first neighbor network node includes determining the interference pattern matches one of a plurality of predefined interference patterns, each predefined interference pattern being associated with a respective TDD mode configuration of the network node. According to another aspect of this embodiment, each predefined interference pattern is associated with a respective TDD mode configuration of the first neighbor network node. According to another aspect of this embodiment, the determined potential reason for the interference is a TDD mode misconfiguration between the network node and the neighbor network node.

According to another aspect of this embodiment, the network node is in communication with a plurality of neighbor network nodes including the first neighbor network node. The memory further contains instructions executable by the processor. The network node is configured to receive interference information from the plurality of neighbor network nodes, and determine a root cause of the detected interference to be TDD mode configuration and one of the network node and one of the plurality of neighbor network nodes that is associated with the root cause of the detected interference based on the received interference information and the determined potential reason for the interference caused by the first neighbor network node.

According to another aspect of this embodiment, the memory further contains instructions executable by the processor. The network node is configured to determine a corrective action to address the determined root cause of the detected interference, and one of perform the corrective action and instruct the determined one of the plurality of neighbor network nodes that is the root cause of the detected interference due to time misalignment to perform the determined corrective action. According to another aspect of this embodiment, the memory further contains instructions executable by the processor. The network node is configured to communicate the determined potential reason for the interference caused by the first neighbor network node to a network management system, NMS, for further analysis, and receive a correction action to perform to address the detected interference.

According to another embodiment of the disclosure, a system is provided. The system includes a plurality of network nodes for operating in a Time Division Duplex, TDD, network. The plurality of network nodes includes at least a network node and a first neighbor network node. The network node includes a node processor and node memory. The node memory contains instructions executable by the node processor. The first network node is configured to detect interference caused by the first neighbor network node in at least one uplink, UL, subframe, and determine a potential reason for the interference caused by the first neighbor network node.

According to another aspect of this embodiment, the plurality of network nodes includes a plurality of neighbor network nodes including the first neighbor network node. The system further includes a network management system, NMS, in communication with the plurality of network nodes. The NMS includes an NMS processor and a NMS memory. The NMS memory contains instructions executable by the NMS processor. The NMS is configured to receive the determined potential reason for the interference from the first network node, receive interference information from at least one of the plurality of neighbor network nodes, and determine a root cause of the detected interference and one of the plurality of network nodes that is associated with the root cause of the detected interference based on the received determined potential reason for the interference from the first network node and the received interference information from the at least one of the plurality of neighbor network nodes.

According to another aspect of this embodiment, the NMS memory further includes instructions executable by the NMS processor. The NMS is configured to determine a corrective action to address the root cause of the detected interference, and instruct the determined one of the plurality of network nodes that is associated with the root cause of the detected interference to perform the determined corrective action. According to another aspect of this embodiment, the detected interference is downlink, DL, signal based interference caused by the first neighbor network node. According to another aspect of this embodiment, the detected interference corresponds to an interference pattern occurring within a plurality of UL subframes. The determining of the potential reason for the interference caused by the neighbor network node includes determining the interference pattern matches one of a plurality of predefined interference patterns.

According to another aspect of this embodiment, the determined potential reason for the interference is a time misalignment between the network node and the first neighbor network node. According to another aspect of this embodiment, the plurality of network nodes includes a plurality of neighbor network nodes including the first neighbor network node. The network node is in communication with the plurality of neighbor network nodes. The node memory further contains instructions executable by the node processor. The network node is configured to receive interference information from the plurality of neighbor network nodes, and determine a root cause of the detected interference to be time misalignment and one of the network node and one of the plurality of neighbor network nodes that is associated with the root cause of the detected interference based on the received interference information and the determined potential reason for the interference caused by the first neighbor network node. According to another aspect of this embodiment, the node memory further contains instructions executable by the node processor. The network node is configured to determine a corrective action to address the determined root cause of the detected interference due to time misalignment, and one of perform the corrective action and instruct the determined one of the plurality of neighbor network nodes that is the root cause of the detected interference to perform the determined corrective action.

According to another aspect of this embodiment, the detected interference corresponds to an interference pattern occurring in a plurality of UL subframes. The determining of the potential reason for the interference caused by the first neighbor network node includes determining the interference pattern does not match one of a plurality of predefined interference patterns, and determining the detected interference occurs at least in a predefined subframe of the plurality of UL subframes. According to another aspect of this embodiment, the determined potential reason for the interference is a time misalignment between the network node and the first neighbor network node. According to another aspect of this embodiment, the plurality of network nodes includes a plurality of neighbor network nodes including the first neighbor network node. The network node is in communication with the plurality of neighbor network nodes. The node memory contains further instructions executable by the node processor. The network node is configured to receive interference information from the plurality of neighbor network nodes, and determine a root cause of the detected interference to be time misalignment and one of the network node and one of the plurality of neighbor network nodes that is associated with the root cause of the detected interference based on the received interference information and the determined potential reason for the interference caused by the first neighbor network node.

According to another aspect of this embodiment, the node memory further contains instructions executable by the node processor. The network node is configured to determine a corrective action to address the determined root cause of the detected interference due to time misalignment, and one of perform the corrective action and instruct the determined one of the plurality of neighbor network nodes that is the root cause of the detected interference to perform the determined corrective action. According to another aspect of this embodiment, the detected interference corresponds to an interference pattern occurring within a plurality of UL subframes. The determining of the potential reason for the interference caused by the first neighbor network node includes determining the interference pattern matches one of a plurality of predefined interference patterns, each predefined interference pattern being associated with a respective TDD mode configuration of the network node.

According to another aspect of this embodiment, each predefined interference pattern is associated with a respective TDD mode configuration of the first neighbor network node. According to another aspect of this embodiment, the determined potential reason for the interference is a mode misconfiguration between the network node and the first neighbor network node.

According to another aspect of this embodiment, the plurality of network nodes includes a plurality of neighbor network nodes including the first neighbor network node.

The network node is in communication with the plurality of neighbor network nodes. The node memory further contains instructions executable by the node processor. The network node is configured to receive interference information from the plurality of neighbor network nodes, and determine a root cause of the detected interference to be TDD mode misconfiguration and one of the network node and one of the plurality of neighbor network nodes that is associated with the root cause of the detected interference based on the received interference information and the determined potential reason for the interference caused by the first neighbor network node.

According to another aspect of this embodiment, the node memory further contains instructions executable by the node processor. The network node is configured to determine a corrective action to address the determined root cause of the detected interference due to the TDD mode misconfiguration, and one of perform the corrective action and instruct the determined one of the plurality of neighbor network nodes that is the root cause of the detected interference to perform the determined corrective action. According to another embodiment of the disclosure, a method for a network node in a Time Division Duplex, TDD, network is provided. Interference caused by a first neighbor network node in at least one uplink, UL, subframe is detected. A potential reason for the interference caused by the first neighbor network node is determined.

According to another aspect of this embodiment, the detected interference is downlink, DL, signal based interference caused by the first neighbor network node. According to another aspect of this embodiment, the detected interference corresponds to an interference pattern that occurs within a plurality of UL subframes. The determining of the potential reason for the interference caused by the neighbor network node includes determining the interference pattern matches one of a plurality of predefined interference patterns. According to another aspect of this embodiment, the determined potential reason for the interference is a time misalignment between the network node and the first neighbor network node.

According to another aspect of this embodiment, the network node is in communication with a plurality of neighbor network nodes including the first neighbor network node. Interference information from the plurality of neighbor network nodes is received. A root cause of the detected interference is determined to be time misalignment. One of the network node and one of the plurality of neighbor network nodes that is associated with the root cause of the detected interference is determined based on the received interference information and the determined potential reason for the interference caused by the first neighbor network node.

According to another aspect of this embodiment, a corrective action to address the determined root cause of the detected interference due to time misalignment is determined. One of the corrective action is performed and the determined one of the plurality of neighbor network nodes that is associated with the root cause of the detected interference is instructed to perform the determined corrective action. According to another aspect of this embodiment, the detected interference corresponds to an interference pattern occurring in a plurality of UL subframes. The determining of the potential reason for the interference caused by the first neighbor network node includes determining the interference pattern does not match one of a plurality of predefined interference patterns, and determining the detected interference occurs at least in a predefined subframe of the plurality of UL subframes.

According to another aspect of this embodiment, the determined potential reason for the interference is a time misalignment between the network node and the first neighbor network node. According to another aspect of this embodiment, the network node is in communication with a plurality of neighbor network nodes including the first neighbor network node. Interference information from the plurality of neighbor network nodes is received. A root cause of the detected interference is determined to be time misalignment, and one of the network node and one of the plurality of neighbor network nodes that is associated with the root cause of the detected interference is determined based on the received interference information and the determined potential reason for the interference caused by the first neighbor network node.

According to another aspect of this embodiment, determining a corrective action to address the determined root cause of the detected interference due to time misalignment is determined. One of the corrective action is performed and the determined one of the plurality of neighbor network nodes that is associated with the root cause of the detected interference is instructed to perform the determined corrective action. According to another aspect of this embodiment, the detected interference corresponds to an interference pattern occurring within a plurality of UL subframes. The determining of the potential reason for the interference caused by the first neighbor network node includes determining the interference pattern matches one of a plurality of predefined interference patterns, each predefined interference pattern being associated with a respective TDD mode configuration of the network node.

According to another aspect of this embodiment, each predefined interference pattern is associated with a respective TDD mode configuration of the first neighbor network node. According to another aspect of this embodiment, the determined potential reason for the interference is a mode misconfiguration between the network node and the neighbor network node. According to another aspect of this embodiment, the network node is in communication with a plurality of neighbor network nodes including the first neighbor network node. Interference information from the plurality of neighbor network nodes is received. A root cause of the detected interference is determined to be TDD mode misconfiguration, and one of the network node and one of the plurality of neighbor network nodes that is associated with the root cause of the detected interference is determined based on the received interference information and the determined potential reason for the interference caused by the first neighbor network node.

According to another aspect of this embodiment, a corrective action to address the determined root cause of the detected interference due to the TDD mode misconfiguration is determined. One of the corrective action is performed and the determined one of the plurality of neighbor network nodes that is associated with the root cause of the detected interference instructed to perform the determined corrective action. According to another aspect of this embodiment, the determined potential reason for the interference caused by the first neighbor network node is communicated to a network management system, NMS, for further analysis. A correction action to perform to address the detected interference is received According to another embodiment of the disclosure, a network node for a Time Division Duplex, TDD, network is provided. The network node includes an interference detection module that is configured to determine interference caused by a first neighbor network node in at least one uplink, UL, subframe has been detected, and determine a potential reason for the interference caused by the first neighbor network node.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein:

FIG. 5 is an exemplary time misalignment table of UL interference caused by time misalignment in accordance with the principles of the disclosure;

FIG. 7 is an exemplary mode misconfiguration table illustrating locations of UL interference detected by a network node in accordance with the principles of the disclosure;

DETAILED DESCRIPTION

Figure 1:
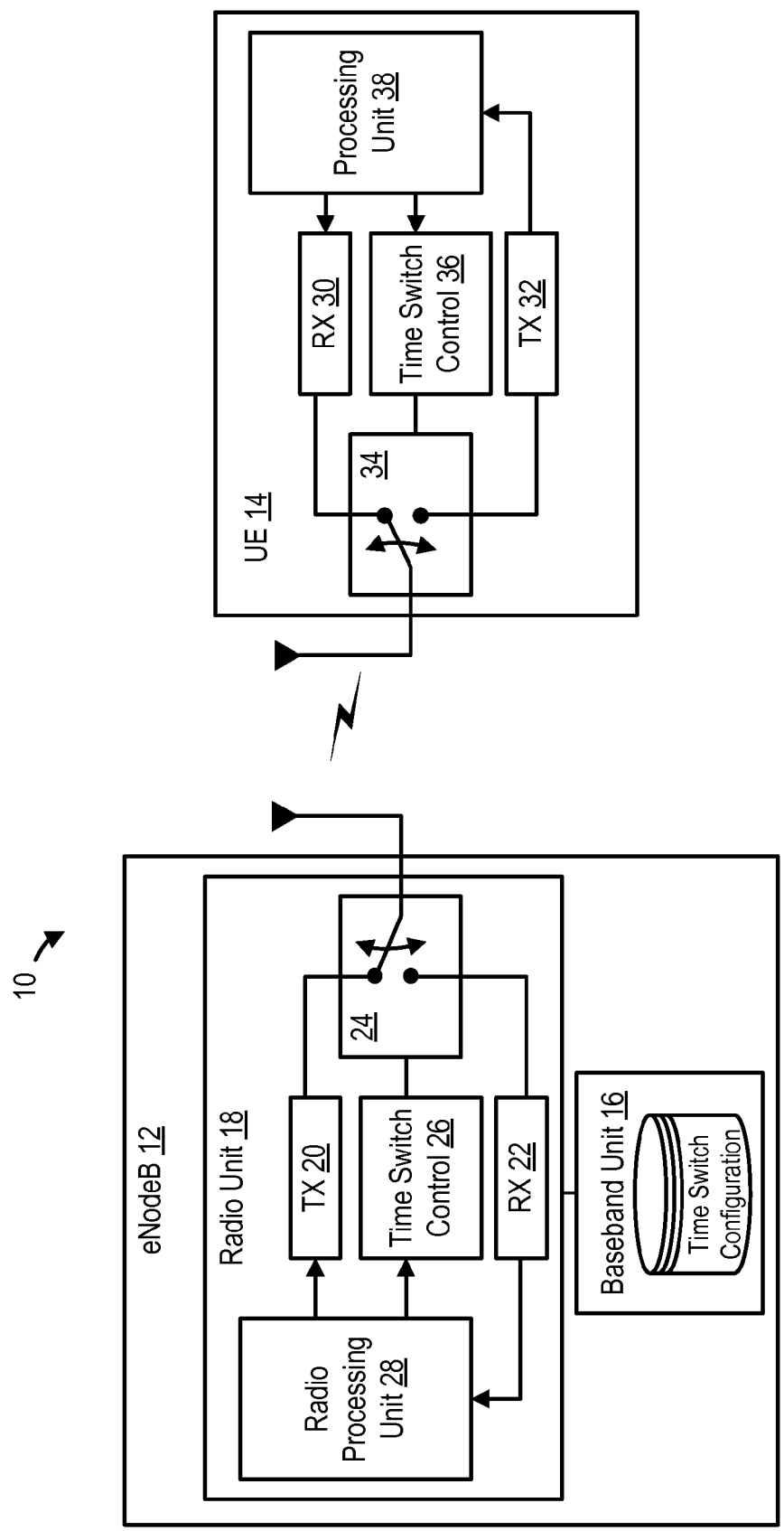
FIG. 1 is a block diagram of an existing LTE TDD system.

The system, network node and methods described herein provide for identifying a potential reason and root cause of uplink (UL) interference based at least in part on a determined UL interference pattern or signature associated with the UL interference. The interference pattern is advantageously determined at the radio frame level within a few radio frames, within one radio frame or within one radio subframe in some cases, and may be subsequently analyzed with respect to interference information of other network nodes to determine the root cause of the UL interference. Further, the system, network node and methods described herein provide for automated self-correction by reconfiguring (i.e., shift in TDD timing reference or TDD mode reconfiguration) the one or more network nodes that are associated with the root cause of the UL interference in order to help minimize the interference. Accordingly, the system, network node and method components have been represented where appropriate by conventional symbols in the drawings, showing only those specific details that are pertinent to understanding the embodiments of the concepts described herein so as not to obscure the disclosure with details that will be readily apparent to those of ordinary skill in the art having the benefit of the description herein.

Before describing in detail exemplary embodiments that are in accordance with the disclosure, it is noted that the embodiments reside primarily in combinations of apparatus components and processing steps related to identifying UL interference, determine a potential reason for the UL interference, determining a root cause of the UL interference and determine corrective action to address the UL interference. Accordingly, components have been represented where appropriate by conventional symbols in the drawings, shown only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Figure 2:
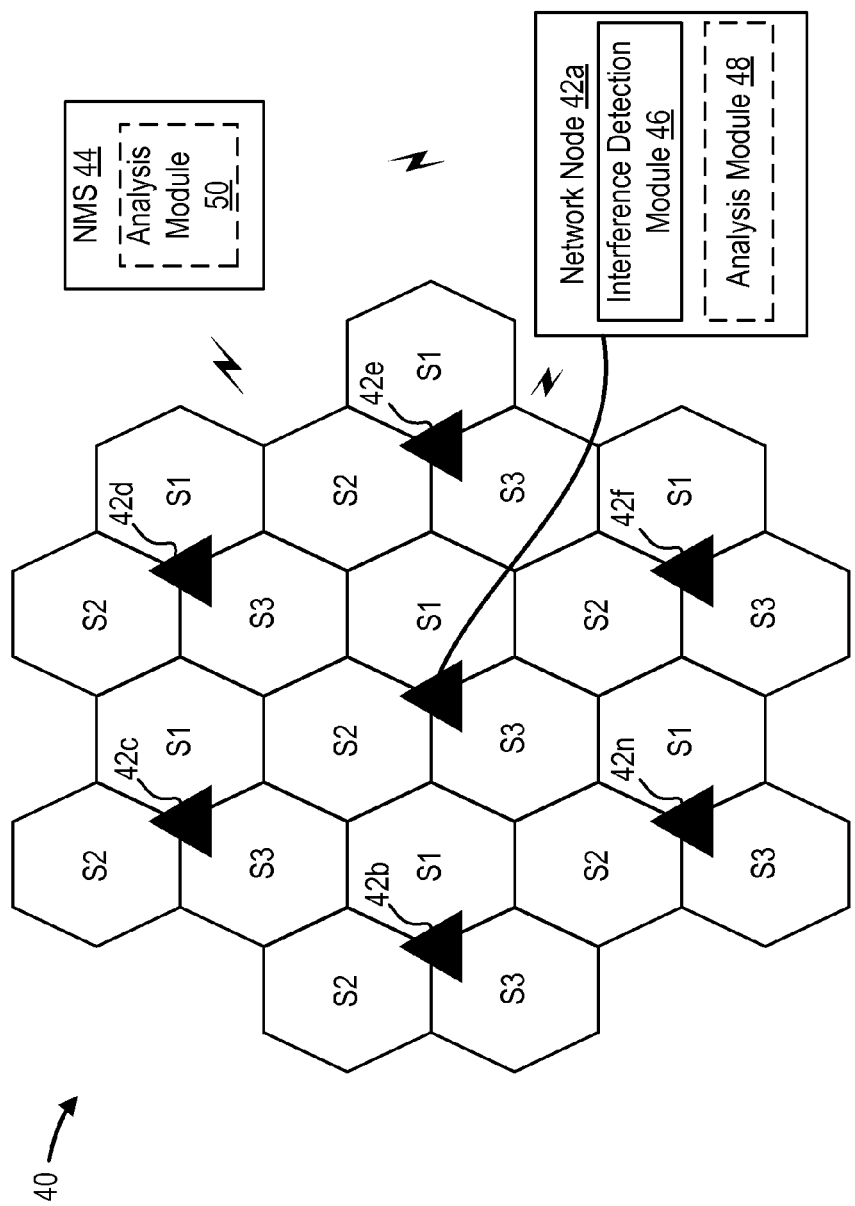
FIG. 2 is a block diagram of an exemplary system for detecting, identifying and analyzing uplink (UL) interference in accordance with the principles of the present disclosure.

Referring now to drawing figures in which like reference designators refer to like elements there is shown in FIG. 2 an exemplary system for detecting, identifying and analyzing UL interference in accordance with the principles of the present disclosure and designated generally as "40." System 40 includes multiple network nodes 42a-42n (referred to collectively as "network node 42") in communication with each other and with one or more network management systems 44 ("NMS 44"). For example, network nodes 42 may communicate with each other over a 3GPP X2 interface as is known in the art. In the embodiment illustrated in FIG. 2, each network node 42 supports three cells or sections, namely, S1-S3, in which each sector will have a respective cell ID. This specific sector arrangement is shown for the sake of expediency; however, in other embodiments, more or less than three cells/sections may be supported by respective network nodes 42.

Figure 8:
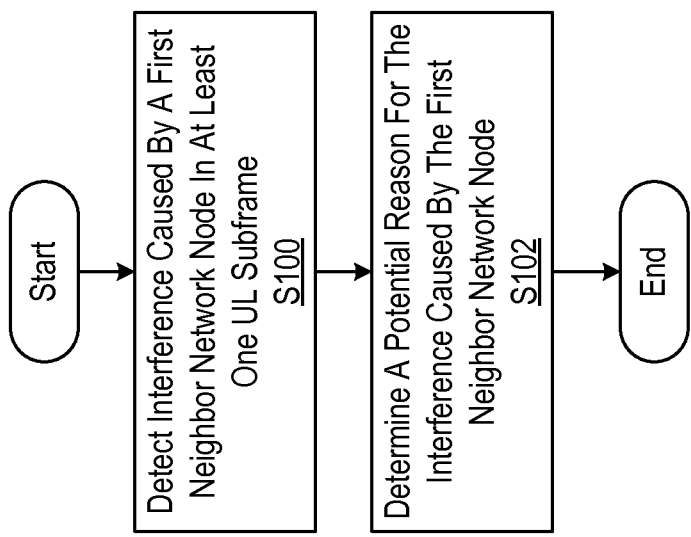
FIG. 8 is an exemplary interference identification process of an interference detection module in accordance with the principles of the disclosure.
Figure 9:
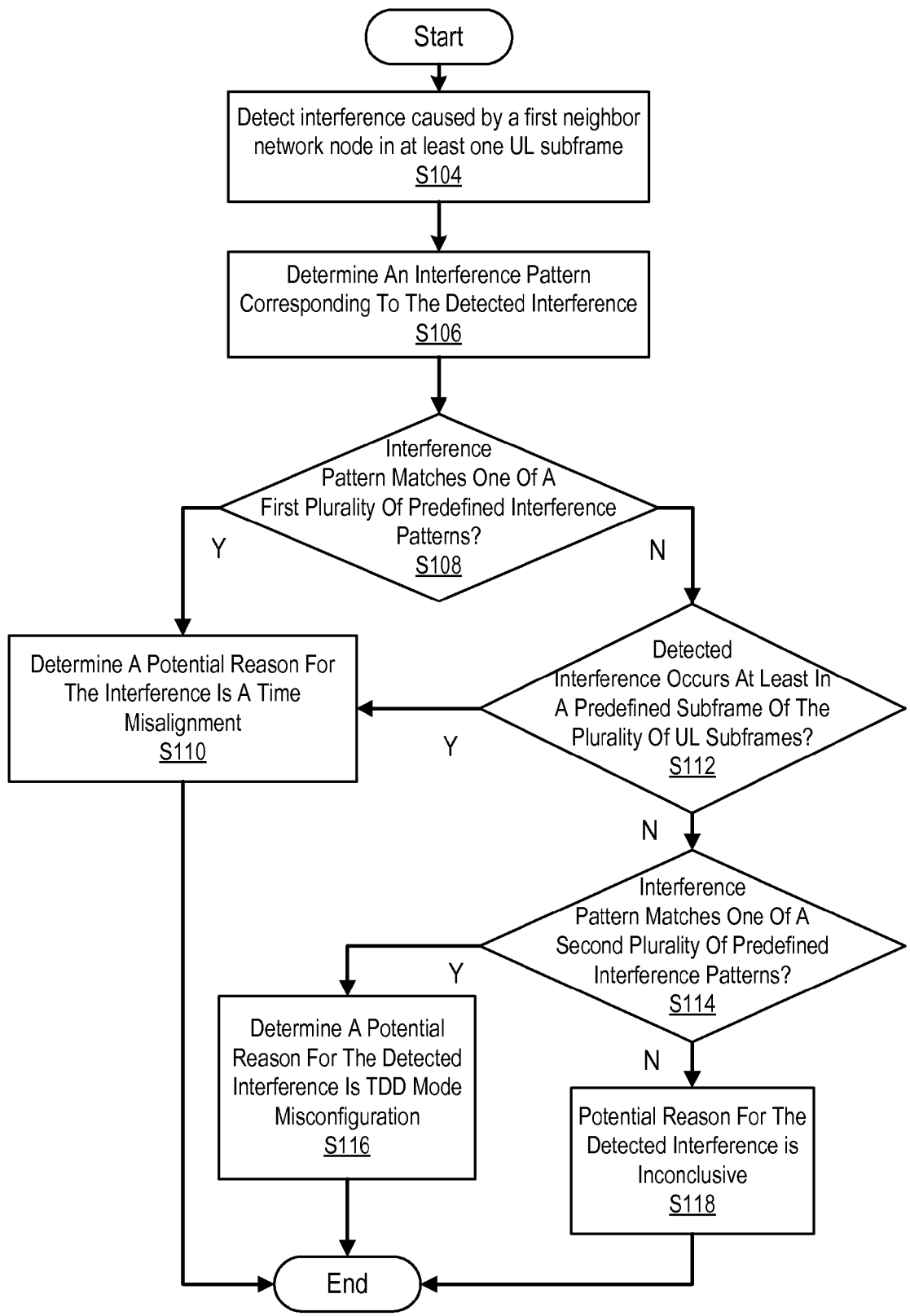
FIG. 9 is an alternative interference identification process of an interference detection module in accordance with the principles of the disclosure.
Figure 12:
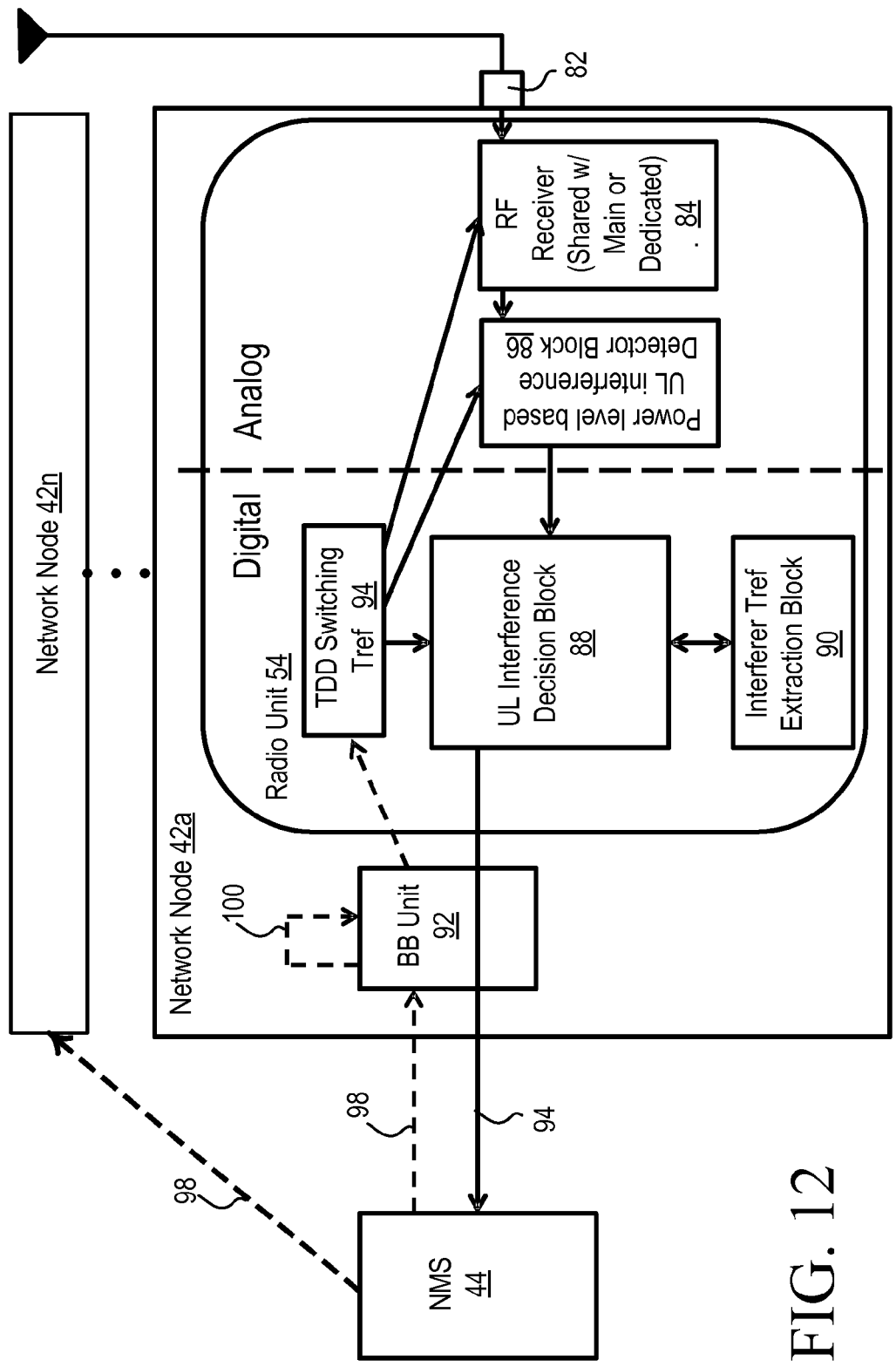
FIG. 12 is a functional block diagram of one embodiment of network node in accordance with the principles of the disclosure.
Figure 13:
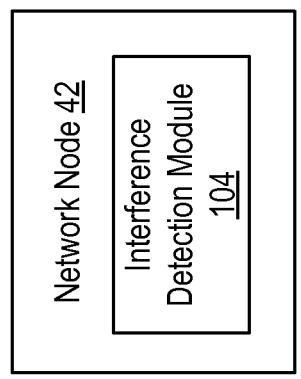
FIG. 13 is an alternative block diagram of network node in accordance with the principles of the disclosure.

One or more network nodes 42 may include interference detection module 46 for detecting interference and determining a potential reason for the detected interference, as discussed in detail with respect to FIGS. 8, 9 and 13. One or more network nodes 42 may include analysis module 48 for determining the network node 42 responsible for the interference, determining the root cause of the interference, determining corrective action to address the root cause of the interference and/or causing the corrective action to be implemented, as discussed in detail with respect to FIGS. 11 and 12. For example, network node 42a is illustrated as including both interference detection module 46 and analysis module 48.

In one embodiment, network node 42 does not include analysis module 48 such that the determination of network node 42 responsible for the interference, determination of the root cause of the interference, determination of corrective action and instructions to implement the correction action are performed by NMS 44. For example, NMS 44 includes NMS analysis module 50, as described in detail with respect to FIGS. 3 and 11.

A block diagram of system 40 in accordance with the principles of the disclosure is described with reference to FIG. 3. System 40 includes UE 14 that performs the same functions as described in FIG. 1. System 40 further includes one or more network nodes 42 for performing network node functionality as described herein. In one embodiment, one or more networks nodes 42a-42n may include interference detection module 46, and may also include analysis module 48.

For example, network node 42a includes baseband unit 52, radio unit 54, transmitter 56, receiver 58, switch 60 and time switch controller 62 for performing similar functions as corresponding components of eNB 12 in FIG. 1. In one embodiment, network node 42a includes downlink (DL) receiver 66 that is configured to monitor the receiver channel for DL signals from one or more neighbor network nodes 42. For example, during a subframe dedicated to receiving uplink (UL) signals from UE 14, DL receiver 66 may detect DL signals from neighbor network node 42n. Receiver 58 may need to be desensitized in order to protect network node 42a hardware and DL receiver 66 may be configured to handle higher energy signals. For example, a DL signal from network node 42n may be significantly stronger in power than as signal received from UE 14 in which the DL signal from the network node 42n is used as a basis for performing various functions, as described herein. For example, in one embodiment, a DL signal from network node 42n or the combined signal from multiple network nodes 42 may be tens of dBs higher than a signal received from UE 14. In one embodiment, DL receiver 66 may be part of receiver 58.

Network node 42a includes one or more processors 68 in communication with network node 42a components. Alternatively, processor 68 functionality described herein may be performed by radio processing unit 64 and/or baseband unit 52. Network node 42a includes memory 70. Memory 70 may include non-volatile and volatile memory. For example, non-volatile memory may include a hard drive, flash memory, programmable integrated circuits, memory stick, solid state memory and the like. Also, volatile memory may include random access memory and others known in the art. Memory 70 stores program instructions such as those for interference detection module 46 and/or analysis module 48. For example, interference detection module 46 includes instructions, which when executed by processor 68, causes processor 68 to perform the interference identification process, as discussed in detail with respect to FIGS. 8 and 9. For example, analysis module 48 includes instructions, which when executed by processor 68, causes processor 68 to perform the interference analysis process, as discussed in detail with respect to FIG. 10. In one embodiment, memory 70 is part of baseband unit 52. Network nodes 42a that includes both interference detection module 46 and analysis module 48 is considered a "super node" that is capable of detecting interference and analyzing information from other network nodes 42 to determine the source of the interference.

Figure 3:
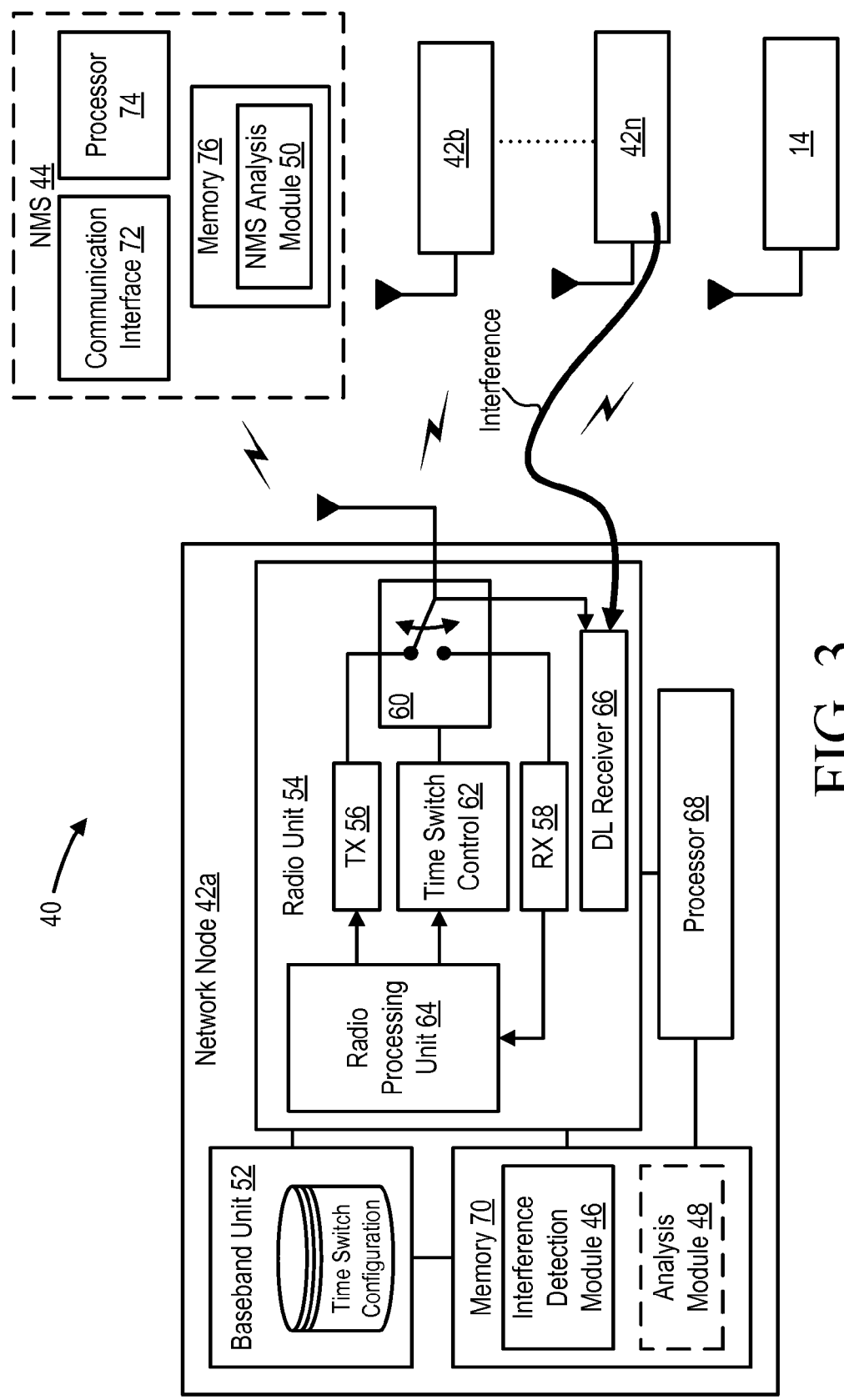
FIG. 3 is a block diagram of the exemplary system of FIG. 2 in accordance with the principles of the disclosure.

However, while network node 42a is illustrated in FIG. 3 as including both interference detection module 46 and analysis module 48, analysis module 48 may be omitted from network node 42a. For example, the functionality of analysis module 48 may be performed by NMS 44, as discussed in detail with respect to FIG. 11. In one embodiment, one or more network nodes 42 do not perform the functionality associated with both interference detection module 46, analysis module 48 and DL receiver 66 such that these "ordinary" nodes perform functionality similar to eNBs 12. Other variations and combinations of "ordinary" nodes, network nodes 42 and "super" network nodes 42 are possible in accordance with the teachings of the disclosure. As will be discussed below, interference identification refers, in part, to determining a potential reason for the cause of interference. The two causes of interference discussed herein are time misalignment and TDD mode misconfiguration, although the disclosure is not limited to such.

Figure 4:
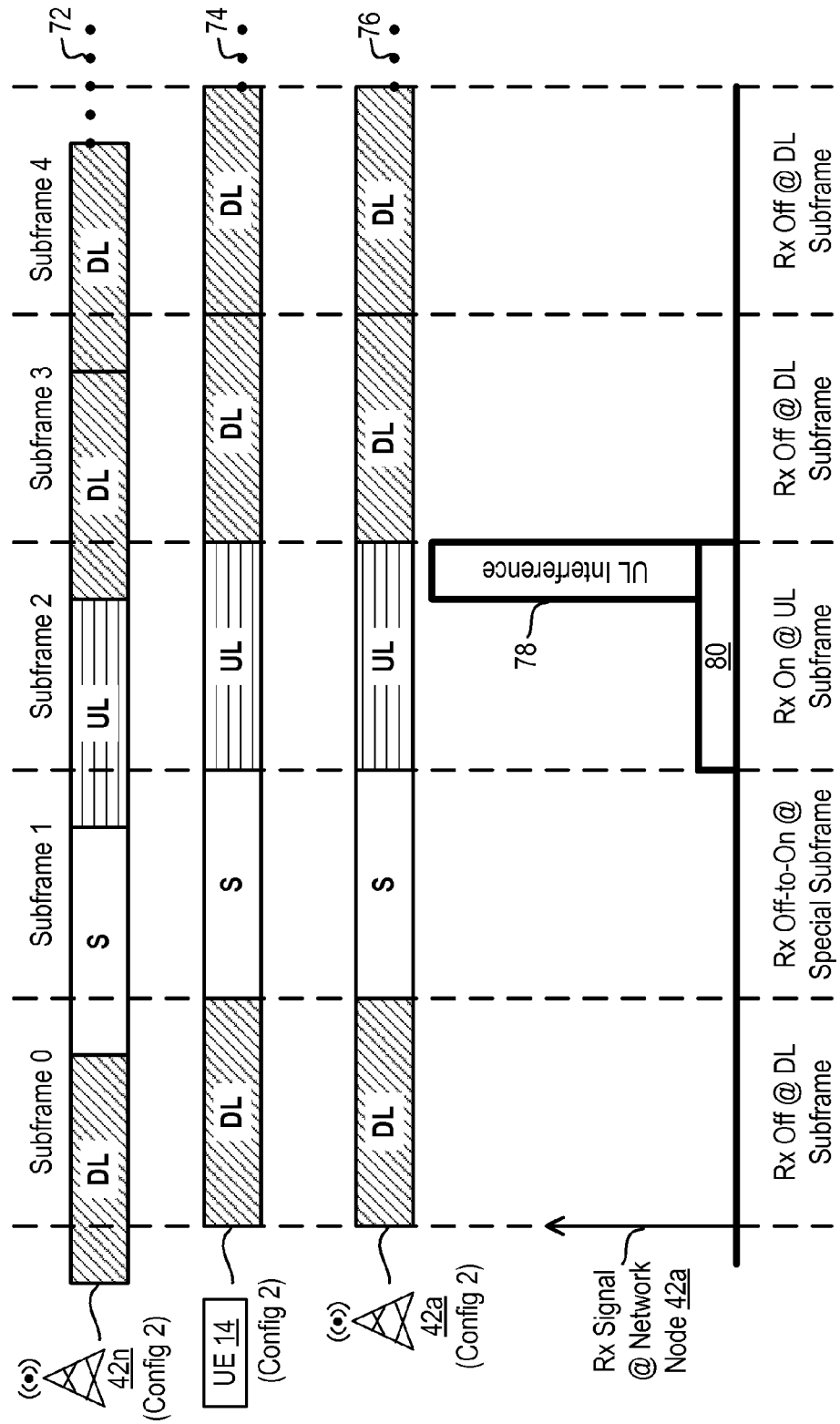
FIG. 4 is an exemplary block diagram of Network Node level UL interference caused by time misalignment in accordance with the principles of the disclosure.

An exemplary diagram of UL interference caused by time misalignment is described with reference to FIG. 4. Network nodes 42a and 42n are operating using the same configuration as predefined by a network operator and/or other entity. In this embodiment, network node 42a and network node 42n are operating according to TDD MODE configuration 2 (Table 1). Only subframes 0-4 out of subframes 0-9 are illustrated in FIG. 4 for clarity. One of ordinary skill in the art will recognize that network nodes 42a and 42n may be operating any one of a predefined TDD mode configuration, e.g., TDD mode configuration 0 to 6, and that more than two network nodes 42 may be included in FIG. 4. UE 14 is also operating according to the TDD mode configuration of network nodes 42a and 42n such that the UL subframes, special subframes (S) and DL subframes of network nodes 42a and 42n and UE 14 will be time aligned. In an ideal case, sub frames 72 associated with network node 42n, subframes 74 associated with UE 14 and subframes 76 associated with network node 42a are time aligned with each other. For example, during subframe 0, network nodes 42a and 42n turn off receiver 58 and transmit DL signals to one or more UEs 14 via transmitter 56 as necessary. During subframe 1, network nodes 42 are switching transmission directions, i.e., receiver 58 is changing from an OFF state to an ON state. During subframe 2, receiver 58 at respective network nodes 42 is ON in order to receive UL signals from one or more UEs 14. During subframe 4, receiver 58 of network node 42 is OFF and transmitter 56 is transmitting DL signals to one or more UEs 14 as necessary.

However, as illustrated in FIG. 4, network node 42n has become time misaligned such that subframes 72 are no longer time aligned with subframes 74 and 76. For example, DL signals being transmitted by network node 42n during subframe 3 are causing interference, i.e., UL interference 78, in UL subframe 2 of network node 42a. In other words, network node 42a receives unexpected DL signals from neighbor network node 42n. The cause of network node 42n's time misalignment may be due to anyone of a variety of reasons such as malfunctioning equipment, drifting Global Positioning Signal (GPS) reference (which is used by networks nodes 42 for time alignment), software malfunction, among other reasons.

The unexpected DL signals from the neighbor network node 42n may be detected by DL receiver 66. Continuing the example of FIG. 4, UL subframe 7 (not shown in FIG. 4 but illustrated in Table 1), will also detect UL interference 78 due to the time misalignment of neighbor network node 42n, i.e., DL signals on DL subframe 8 of neighbor network node 42n begin early such that DL signals from neighbor network node 42n are detected in UL subframe 7 of network node 42a.

As illustrated in FIG. 4, network node 42a will typically detect UL interference 78 in the form of signal spike(s) or narrow pulse(s) in which UL interference 78 from neighbor network node 42n can be significantly stronger than received signal 80 from UE 14. For example, in one embodiment, UL interference 78 from neighbor network node 42n may be tens of dBs higher than received signal 80 from UE 14. Therefore, in some instances, UL interference 78 may be severe due to the high energy levels of network nodes 42 signals when compared to UE signals, thereby causing substantial noise and severely degrading network performance. In one embodiment, UL interference 78 or UL interference spike duration/width are a fraction of a subframe duration, e.g., less than 1 millisecond (ms). While FIG. 4 describes detection of UL interference 78 with respect to TDD mode configuration 2, FIG. 5 illustrates different locations of interference caused by time misalignment with respect the various TDD mode configurations illustrated in Table 1, as discussed below.

An exemplary timing misalignment table illustrating predefined locations of interference, i.e., interference patterns or signatures, for various TDD mode configurations is described with reference to FIG. 5. Interference in subframes resulting in misalignment is shown in FIG. 5 by underlying the "U" and/or the "D". For example, if network nodes 42 and UE 14 are configured to operate in TDD mode configuration 1, a time misaligned network node 42, e.g., network node 42n, may cause interference in one or more of subframes 3, 4, 8 and 9 or UL interference 78 in subframes 3 and 8 of network node 42a due to network node 42n starting its DL transmission early. The predefined location of the interference spikes cover different TDD mode configurations and different types of time misalignment, i.e., time reference leads or lags with respect to other similarly configured network nodes. The example of FIGS. 4-5 illustrates a situation where time reference of network node 42n leads other network nodes 42.

Figure 6:
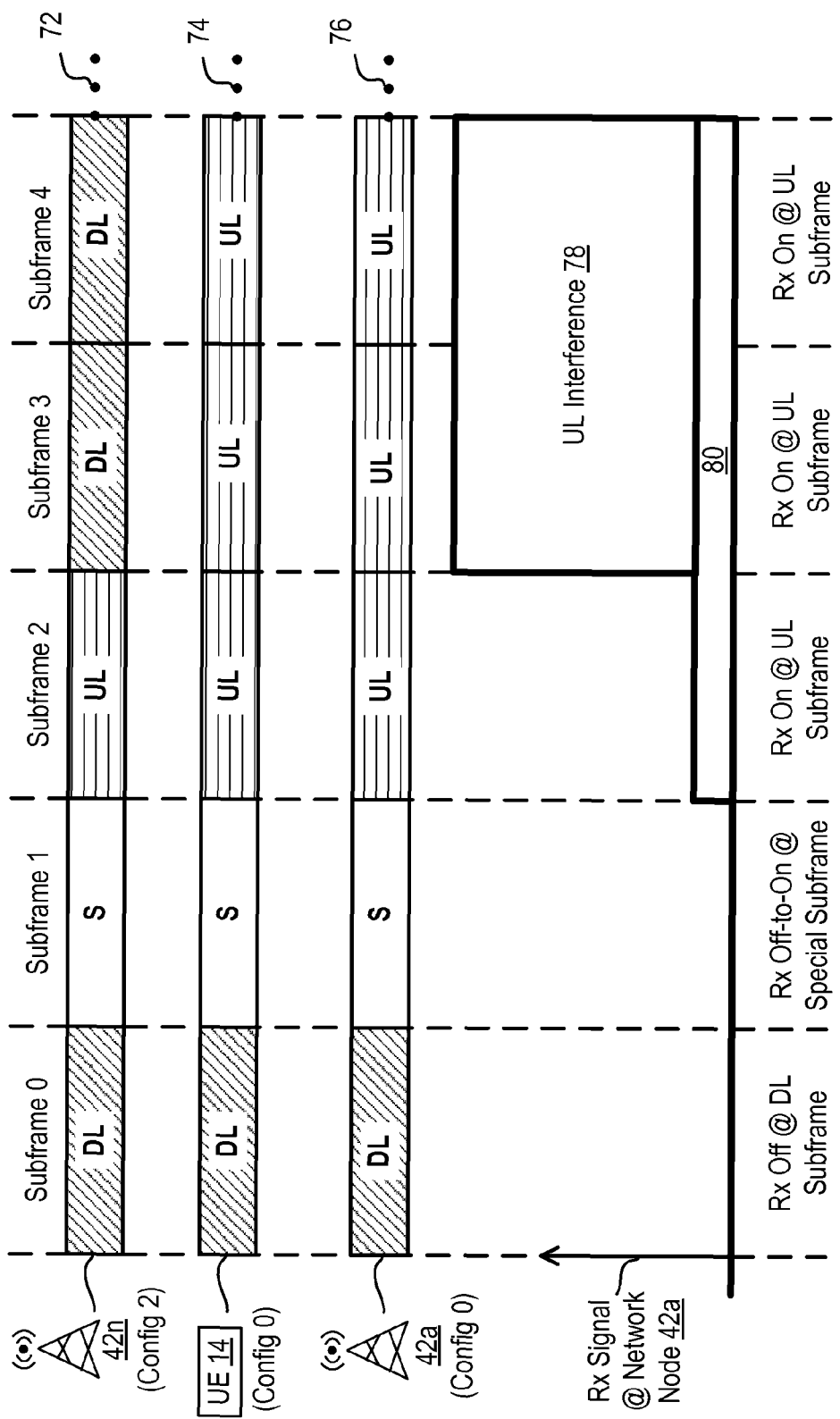
FIG. 6 is an exemplary block diagram of UL interference caused by TDD mode misconfiguration in accordance with the principles of the disclosure.

An exemplary block diagram of UL interference caused by TDD mode misconfiguration is described with reference to FIG. 6. Similar to FIG. 4, in this example, network node 42n is operating in TDD mode configuration 2; however, UE 14 and network node 42a are operating in TDD mode configuration 0. Due to network node 42n transmitting DL signals during subframes 3 and 4 according to configuration 2, network node 42a will detect these DL signals during UL subframes 3 and 4 that are meant to capture UL signals from UEs. Therefore, network node 42a detects UL interference 78 during subframes 3-4 due the TDD mode misconfiguration of network node 42n that is transmitting DL signals while other network nodes are configured to receive UL signals from UEs 14. The TDD mode misconfiguration at network node 42n may be caused by various reasons such as configuration error, equipment malfunctioning, hardware error and software error, among other reasons. One of ordinary skill in the art will recognize that while FIG. 6 illustrates one example of TDD mode misconfiguration, other TDD mode misconfigurations are possible, as discussed with respect to FIG. 7.

An exemplary mode misconfiguration table illustrating predefined locations where UL interference 78 is expected due to various misconfiguration situations is described with reference to FIG. 7. Continuing the example of FIG. 6 where network node 42n (TDD misconfigured node) is operating in TDD mode configuration 2 and network node 42a is operating in TDD mode configuration 0, the mode misconfiguration table of FIG. 7 illustrates that UL interference 78 will be detected in by network node 42a in subframes 3, 4, 8 and 9. From the perspective of network node 42n that is detected the inference, network node 42a may eventually determine that the offending network node, i.e., network node 42n, is misconfigured and operating in TDD mode configuration 2 based on network node 42a's knowledge of its TDD mode configuration, which may be stored in baseband unit 52, and a determination of subframes where UL interference 78 occurs. In other words, the interference pattern, e.g., UL interference 78 detected in subframes 3, 4, 8 and 9, is used to determine a potential reason for detected interference. One of ordinary skill in the art will recognize that mode misconfiguration table includes various predefined interference patterns, e.g., interference in subframe 3, 4, 8 and 9, interference in subframe 3 and 4, interference in subframe 4, that are used by network node 42 to determine (1) whether a potential reason for UL interference is due to TDD mode misconfiguration and (2) the TDD mode of the misconfigured network node. The width/duration of the UL interference 78 may be measured in units of subframe time, e.g., 1 ms, as TDD mode misconfiguration may cause longer durations of UL interference 78 than experience due to network node 42 time misalignment.

An exemplary interference identification process of interference detection module 46 is described with reference to FIG. 8. While one or more network nodes 42 may include interference detection module 46 for performing the interference identification process, the interference identification process of interference detection module 46 will now be described from the perspective of network node 42a in which network node 42n is the offending network node, i.e., the network node that is causing UL interference 78. Processor 68 of network node 42a determines interference caused by neighbor network node 42n has been detected (Block S100). For example, processor 68 determines DL receiver 66 or receiver 58 has received UL interference 78 caused by neighbor node 42n, i.e., the detected interference is DL signal based interference caused by the first neighbor network node 42n. Processor 68 determines a potential reason for the interference caused by the neighbor network node 42n (Block S102). In particular, processor 68 determines a potential reason for the interference based on an interference pattern of the detected interference. For example, if the UL interference 78 matches one of the predefined interference patterns of time misalignment table, processor 68 determines the potential reason for the detected interference is time misalignment of a neighbor network node 42n. In another example, if the UL interference 78 matches one of the predefined interference patterns of mode misconfiguration table, processor 68 determines the potential reason for the detected interference is TDD mode misconfiguration. Since network node 42a may in fact be the node responsible for the interference, interference detection module 46 is determining a potential reason for the interference in which the potential reason for the interference will be verified or repudiated by the analysis process or the NMS analysis process that will determine the root cause of the interference, described in detail with respect to FIG. 10 if one of the networks nodes 42 is performing the analysis process or with respect to FIG. 11 if NMS 44 is performing the NMS analysis process.

Based on the determination of Block S102, network node 42a can differentiate, at the radio subframe level, the potential reasons for the interference such as time misalignment or the TDD mode misconfiguration of the UL-DL switching pattern. In other words, network node 42a is advantageously able to identify a potential reason for the UL interference in a matter of one or more radio frames, i.e., enough radio subframes to match up the interference patterns, which is in the order to tens of milliseconds depending on the number of frames being analyzed. In one embodiment, network node 42a determines the potential reason for the detected interference based on UL interference in a matter of one radio frame, i.e., subframes 0-9. In another embodiment, network node 42a determines the potential reason for the detected interference based on UL interference in a matter of one or more subframes 0-9, but less than a radio frame. In yet another embodiment, network node 42 determines the potential reason for the detected interference based on UL interference in a matter of two or more radio frames. The amount of subframes and/or radio frames for determining the potential reason for the detected interference based on UL interference may vary depending on the cause of the interference and/or traffic loading, among other reasons.

An alternative interference identification process of interference detection module 46 is described with reference to FIG. 9. While one or more network nodes 42 may include interference detection module 46 for performing the alternative interference identification process, the alternative interference identification process of interference detection module 46 will now be described from the perspective of network node 42a in which network node 42n is the offending network node, i.e., the network node that is causing UL interference 78. Processor 68 of network node 42a determines interference caused by neighbor network node 42n has been detected in at least one UL subframe of network node 42a (Block S104). For example, processor 68 determines if the detected interference is greater than a predefined threshold. The predefined threshold is set to a threshold level that distinguishes neighbor network node signals from other receive signals such as UE signals, i.e., interference signals from neighbor network nodes 42n will satisfy the predefined threshold while UE signals will not. Processor 68 that determines the predefined threshold has been satisfied may trigger further action such as continuing to Block S106.

Processor 68 determines an interference pattern corresponding to the detected interference (Block S106). For example, processor 68 determines the subframes having the detected interference, i.e., interference satisfying the predefined threshold. The detected interference corresponds to an interference pattern occurring within one or more UL subframes. Processor 68 may further determine a duration of the interference within the subframes. Processor 68 determines whether the interference pattern determined in Block S106 matches one of the time misalignment interference patterns of time misalignment table, i.e., determining whether the interference pattern matches one of a plurality of predefined interference patterns (Block S108). As discussed above, the determined interference pattern may be based on measurements or detections, by network node 42a, made over one or more radio subframes or frames. If the interference pattern determined in Block S106 matches one of the time misalignment interference patterns, e.g., one of the patterns shown in FIG. 5, processor 68 determines a potential reason for the detected interference is a time misalignment, i.e., time misalignment between the network node 42a and neighbor network node 42n (Block S110).

In one embodiment, network node 42a may determine additional interference information in addition to determining the potential reason for the detected interference is time misalignment. For example, network node 42a may analyze the data collected from a monitoring Rx Channel by using DL receiver 66 for decoding DL primary synchronization signal (PSS) and second synchronization signal (SSS) of neighbor network node 42n causing the interference, thereby allowing network node 42a to determine the obsolete time reference of the offending cell, i.e., neighbor network node 42n causing interference. The PSS is mapped to the third symbol of slot #2 and slot #12 of the radio frame in the central 62 subcarriers per TDD radio frame in 10 ms interval, and the SSS is allocated in the last symbol of slot #1 and slot #11 of the radio frame. If the SSS and PSS symbols do not overlap with the interfered UL subframe duration, this method is not sufficient to determine additional interference information.

To address the above situation where additional interference information cannot be determined, the Reference Signals (RS) that occurs at symbol 0 and symbol 4 of every slot in the radio frame are collected and examined by network node 42a. Sweeping through all 504 possible RS sequences associated with the physical cell ID of the neighbor network node 42n causing the interference, network node 42a can identify the RS sequence that matches the offending neighbor network node 42n's physical cell ID. Computing and correlating the measured RS signals allows network node 42a to determine the physical cell ID in order to further retrieve the time reference from neighbor network node 42n causing the interference.

In particular, since the RS information does not occupy the whole frequency space per symbol where they are presented, the Fast Fourier transform (FFT) should be applied to allow extraction of the correct RS information in the frequency domain, then apply the inverse FFT (iFFT) to recover back to the time domain to start the physical cell ID computation process. Also, due to the fact that RS signals are at the symbol 0 and symbol 4 of each slot, the FFT needs to apply at a specific time to catch the RS signals.

Referring back to Block S108, if processor 68 determines the interference pattern determined in Block S106 does not match one of the time misalignment interference patterns of time misalignment table, processor 68 determines whether the detected interference occurs in a predefined subframe of the one or more frames (Block S112). In one embodiment, processor 68 determines whether the detected interference from neighbor network node 42n occurs in subframe 2 of one or more frames having respective subframes 0-9. In particular, interference detected in subframe 2 is indicative of time misalignment as opposed to TDD mode misconfiguration because, as shown in FIG. 4, time misalignment may lead to UL interference in subframe 2 whereas TDD mode misconfiguration should not lead to UL interference in subframe 2. For example, as illustrated in FIG. 5, subframe 2 is used for receiving UL communications from UE 14 according to TDD mode configurations 0-6 such that network node 42n being TDD mode misconfigured will still use subframe 2 for UL signals from UE 14. If processor 68 determines the detected interference occurs in the predefined subframe, e.g., subframe 2, processor 68 determines a potential reason for the interference is a time misalignment (Block S110).

Referring back to S112, if processor 68 determines interference, i.e., interference meeting the predefined threshold, does not occur in the predefined subframe, processor 68 determines whether the interference pattern determined in Block S106 matches one of the interference patterns of mode misconfiguration table, i.e., determining whether the interference pattern matches one of a plurality of predefined interference patterns (Block S114). In others words, time misalignment of neighbor network node 42n is likely not the cause of the detected interference such that network node 42a determines if TDD mode misconfiguration could be a potential reason for the detected interference. Each predefined interference pattern of mode misconfiguration table is associated with a respective TDD mode configuration of the network node and the neighbor network node.

In particular, network node 42a uses knowledge of its TDD mode configuration, stored in baseband unit 52, and knowledge of the subframes where interference has been detected to determine whether the interference pattern determined in Block S106 matches one of the predefined interference patterns of mode misconfiguration table. Using the example illustrated in FIGS. 6 and 7, if network node 42a is operating in TDD mode configuration 0, processor 68 determines if the interference pattern determined Block S106 matches one of the predefined interference patterns of row "0" of mode misconfiguration table, e.g., matches one of the following predefined interference patterns of row "0": 4 & 9; 3, 4, 8 & 9; 6, 7, 8 and 9; 3, 4, 6, 7, 8 & 9; 9.

If processor 68 determines the interference pattern determined in Block S106 matches one of the interference patterns of mode misconfiguration table, processor 68 determines a potential reason for the detected interference is TDD mode misconfiguration (Block S116). Further, based on the matching predefined interference pattern, network node 42a is able to determine the TDD mode configuration of the misconfigured neighbor network node 42n. Using the example of FIG. 6, network node 42a is able to determine a potential reason for the detected interference is that neighbor network node 42n is TDD mode misconfigured and operating in TDD mode configuration 2.

Referring back to Block S114, if processor 68 determines the interference pattern determined in Block S106 does not match one of the interference patterns of mode misconfiguration table, processor 68 determines the potential reason for the detected interference is inconclusive (Block S118). In one embodiment, since network node 42a is unable to determine a reason for the detected interference, network node 42a escalates the interference problem to NMS 44. For example, network node 42a may communicate the interference pattern determined in Block S106 and/or other interference information to NMS 44 such that NMS 44 can cross-reference interference information from multiple network nodes 42 to determine a root cause of the detected interference, as discussed in detail with respect to FIG. 11. In another embodiment, network node 42a may escalate the analysis by perform analysis process of analysis module 48, thereby allowing network node 42a (acting as a "super node") to receiving information from neighbor nodes 42 in order to determine a root cause the interference and action to correct the interference problem, as discussed below. For example, network node 42a communicates the determined potential reason for the interference caused by neighbor network node 42n to NMS 44 for further analysis.

Figure 10:
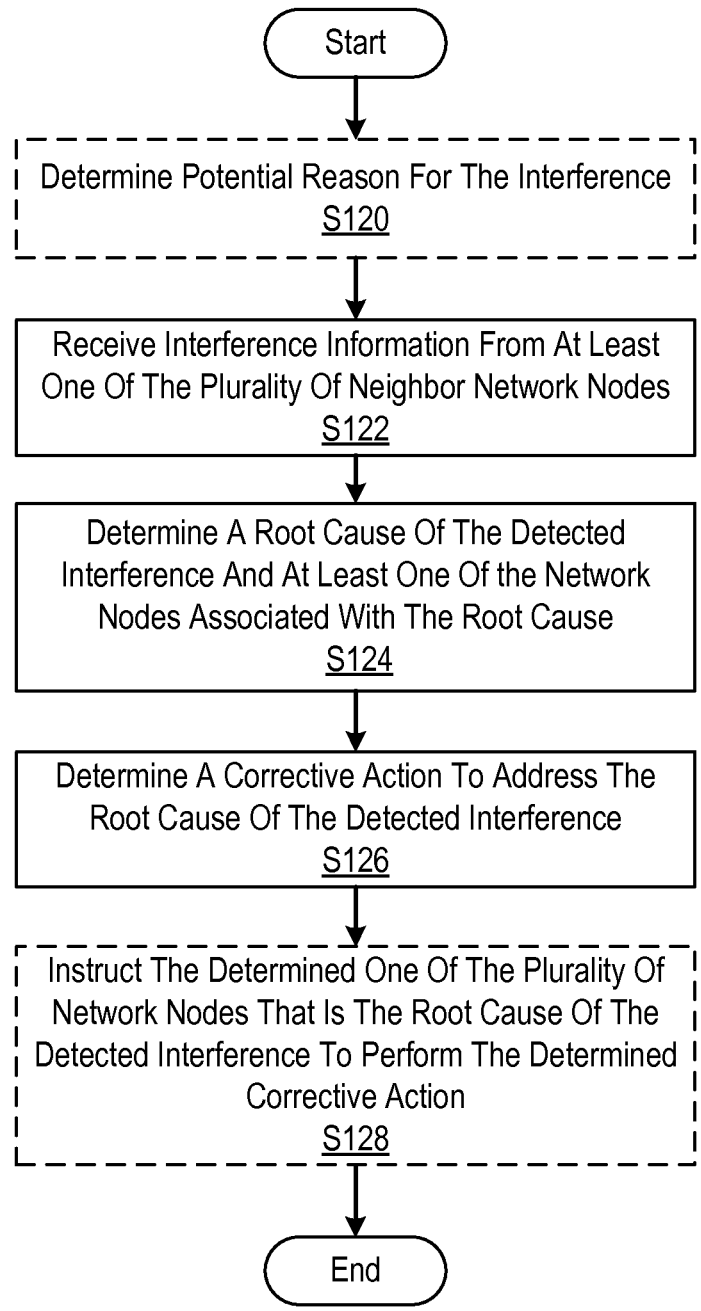
FIG. 10 is an exemplary analysis process of an analysis module in accordance with the principles of the disclosure.

An exemplary analysis process of analysis module 48 is described with reference to FIG. 10. For clarity, the analysis process will now be described from the perspective of network node 42a with examples corresponding to network node 42n or a sector of network node 42a being the offending network node. However, one of ordinary skill in the art will understand that one or more network nodes 42 of system 40 may include analysis module 48 for performing the analysis process. From this perspective, network node 42a that is performing the analysis process, i.e., network node 42a is acting as a "super node".

Processor 68 determines a potential reason for the detected interference, as described with reference to FIG. 8 and FIG. 9 (Block S120). By way of examples, Block S120 can be the process of FIG. 8 or blocks S110/S116 in FIG. 9. In one embodiment, Block S120 may be skipped or omitted if network node 42a performing the analysis process but did not detect interference, i.e., did not perform the interference identification process of interference detection module 46.

Processor 68 determines interference information from at least one of neighbor network nodes 42 has been received (Block S122). For example, one or more neighbor network nodes 42b-n may have detected interference and performed the interference identification process described with respect to FIGS. 8 and 9 such that these one or more neighbor network nodes 42b-n report their results of the interference detection and identification process, i.e., report the determined potential reason for the interference or that the determination of the potential reason was inconclusive. Alternatively or in addition to the reported results of the interference identification process, the one or more neighbor network nodes 42b-n may report other interference information such as whether interference is lagging or leading the subframe, an amount of determined timing misalignment (Tdelta), TDD mode configuration of offending neighbor network node 42, impacted sectors, among other information.

Processor 68 determines a root cause of the detected interference and the one of the plurality of network nodes 42b-n associated with the root cause based at least in part on the received interference information from one or more neighbor network nodes 42b-n and/or the determined potential reason for the detected interference made by network node 42a (Block S124). Rather than a situation where another node itself is the source of the detected interference, an example will now be described where S1 of network node 42 is the root cause of the detected interference. Network node 42a detects time misalignment based interference in S1 that is lagging the respective subframe timing of S1 of network node 42a while the two other sectors S2/S3 of network node 42a detect no interference with their respective subframe timing of S2/S3 of network node 42a, together with the information received from one or more of neighbor network nodes 42b-n, e.g., interference impacted sectors: S3 of neighbor network node 42d, S2 and S3 of network node 42e and S2 of network node 42f; network node 42a may determine the root cause of the detected interference to be a malfunction with S1 of network node 42a. In this case, S1 of network node 42a "thinks" the an offending network node is lagging when in reality network node 42a is transmitting early or in advance of other network nodes including S2 and S3 of network node 42a.

Processor 68 determines corrective action to address the determined root cause of the detected interference (Block S126). Using the example where S1 of network node 42a is the offender, if the root cause is determined to be time misalignment, processor 68 determines a time offset or adjustment for offending S1 of network node 42a to incorporate to reduce the interference. Using an example where network node 42n is the offender, if the root cause is determined to be time misalignment, processor 68 determines a time offset for the offending network node 42n to incorporate in order to reduce the interference, i.e., the TDD switching signal is adjusted to minimize overlapping period where the interference is occurring. In another example, if the root cause is determined to be TDD mode misconfiguration, processor 68 determines an updated TDD mode configuration for the offending network node 42n to implement. In the example illustrated in FIG. 6, processor 68 determines network node 42n should update its TDD mode configuration from configuration 2 to configuration 0.

Processor 68 instructs the offending network node 42n, i.e., determined one of the plurality of network nodes 42 associated with the root cause of the detected interference, to perform the correction action determined in Block S126 (Block S128). In the example illustrated in FIG. 4, network node 42n is instructed to implement a predetermined time offset to help time synchronize subframes 72 of network node 42n with subframes 76 of network node 42a, i.e., network node 42n is instructed to update its TDD time reference by a determined amount. In the example illustrated in FIG. 6, network node 42n is instructed to update its TDD mode configuration to TDD mode configuration 0.

If network node 42a is the offending network node, i.e., network node 42a determines it is associated with the root cause of the interference, then Block S128 may be skipped as network node 42a will implement the determined corrective action of Block S126. In other words, network node 42a will perform the corrective action or instruct the determined one of the plurality of neighbor network nodes, e.g., neighbor network node 42n, that is the root cause of the detected interference to perform the determined corrective action.

In one embodiment, regardless of whether the correction action can be performed by neighbor network node 42n, network node 42a reports the root cause and/or determined corrective action to a network operator. For example, in some cases, neighbor network node 42n may require replacement of a malfunctioning radio or some other operation that requires manual implementation by a technician, such that network node 42a reports the root cause and/or determined corrective action to the network operator to expedite repair. In another embodiment, the corrective action may be implemented without the need of manual implementation by a technician. In this case, network node 42a may notify the network operator of the determined potential problem or root cause, and the corrective action that was implemented.

Figure 11:
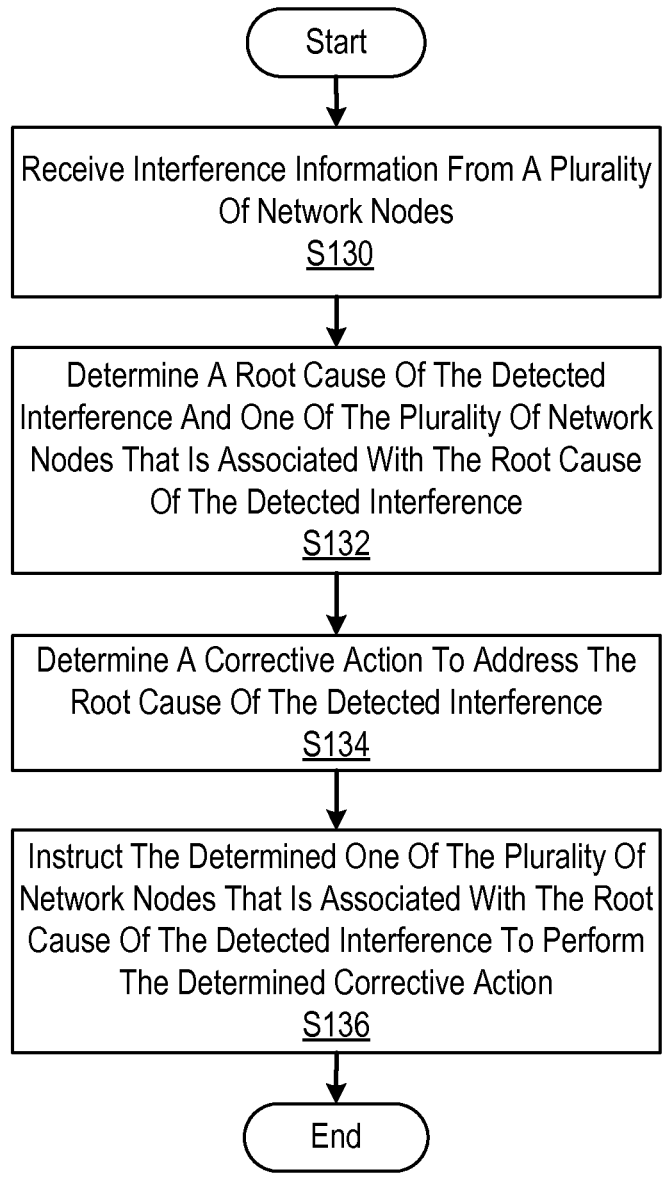
FIG. 11 is an exemplary analysis process of a Network Management System (NMS) analysis module in accordance with the principles of the disclosure.

An exemplary NMS analysis process of NMS analysis module 50 is described with reference to FIG. 11. Processor 74 determines interference information from a plurality of network nodes 42 has been received (Block S130). For example, the interference information may include the results of the interference identification process of module 46 being performed by multiple network nodes 42 and/or may include other interference formation such as whether interference is lagging/leading the subframe, an amount of determined timing misalignment (Tdelta), TDD mode configuration of offending neighbor network node 42, impacted sectors, among other information.

Processor 74 determines a root cause of the detected interference and one of the plurality of network nodes 42 associated with the root cause based at least in part on the received interference information, similar to the determination performed in Block S124 (Block S132). In an alternative embodiment, processor 74 determines one or more of the plurality of network nodes 42 associated with the root cause and/or one or more sectors associated with the root cause based at least in part on the received interference information.

Processor 74 determines correction action for network node 42 associated with the root cause of the detected interference to implement, similar to Block S126 (Block S134). Processor 74 instructs the determined one of the plurality of network nodes 42 that is the root cause of the detected interference to perform the determined corrective action similar to Block S128 (Block S136). In an alternative embodiment Blocks S134 and S136, processor 74 determines correction action(s) for multiple network nodes 42 associated with the root cause of the detected interference such that processor 74 instructs these multiple network nodes 42 to perform the determined corrective action(s). Therefore, in this configuration, instead of network nodes 42 determining the root cause of the interference, network node 42 associated with the root cause and corrective action, NMS 44 performs these functions.

A functional block diagram of one embodiment of network node 42 is described with respect to FIG. 12. In particular, the embodiment illustrated in FIG. 12 includes network node 42 that performs the interference identification process of interference detection module 46, and NMS 44 that performs the NMS analysis process of NMS analysis module 50. Network node 42 includes one or more RF antennas 82 and RF receiver 84 for receiving and processing signals as described with respect to radio unit 54. Power level based UL interference block 86 determines if detected interference is greater than a predefined threshold. The predefined threshold is set to distinguish neighbor network node signals from other receive signals such as UE signals, i.e., interference signals from neighbor network nodes 42 will satisfy the predefined threshold while UE signals will not. Power level based UL interference block 86 may trigger further action if the predefined threshold is satisfied, i.e., triggers UL interference decision block 88. In one embodiment, power level based UL interference block 86 functionality is performed by DL receiver 66 and/or radio processing unit 64 and/or receiver 58. For example, receiver 58 may perform interference block 86 functionality if the implementation is as an analog circuit.

If power level based UL interference block 86 is triggered due to a satisfied threshold, UL interference decision block 88 performs the interference identification process, i.e., attempts to determine a potential reason for the interference. In one embodiment, UL interference decision block 88 performs the determinations of interference detection module 46 that are discussed in detail with respect to FIGS. 4 and/or 6. In one embodiment, UL interference decision block 88 determines the potential reason for the interference is: a time misalignment, TDD mode misconfiguration or inconclusive, as discussed in detail with respect to FIG. 9.

Network node 42 sends the result(s) of UL interference decision block 88 to NMS 44 for analysis. For example, NMS 44 performs the NMS analysis process described in detail with respect to FIG. 11. As part of performing the NMS analysis process, NMS 44 provides instructions 98 to perform specific corrective action to the network node that is the root cause of the interference as described with respect to Block S136. In the example illustrated in FIG. 12, network node 42a is determined to be the root cause of the detected interference such that network node 42a is sent instructions 98 to perform corrective action.

If the corrective action relates to time misalignment, then Tref correction 102 is sent, via instructions 98, to TDD switching Tref for updating. If the corrective action relates to TDD mode configuration, then instructions 98 are sent to Baseband unit 92 to update/change the TDD configuration to a TDD configuration specified in instructions 98. In one embodiment, if NMS 44 determines two or more network nodes 42 are the root causes of the detected interference based on received interference information from a plurality of network nodes 42, then NMS 44 may provide instructions 98 to the two or more network nodes 42 to perform one or more correction actions specified in the instructions 98. One of ordinary skill will understand that if one section, e.g., S1, of network node 42 is determined to be the root cause of the detected interference, then only the configuration of S1 will be updated or corrected by the corrective action as S2 and S3 of the network node are not the problem. Therefore, in this case, corrective action will be applied to equipment supporting S1 of network node 42a without modifying the configurations of S2 and S3 of network node 42a.

An alternative block diagram of network node 42 is described with reference to FIG. 13. Network node 42 includes interference detection module 104 that performs the interference identification process as described with respect to FIG. 8. In another embodiment, interference detection module 104 performs the alternative interference identification process of FIG. 9.

Therefore, the disclosure advantageously solves the problems with existing systems by taking into consideration the embedded information in the detected interference, i.e., the interference pattern or symptom signature, that allows network node 42 and/or NMS 44 to diagnose interference problems. In some case, the interference pattern can be diagnosed in the order to tens of milliseconds. For example, a potential reason for the detected interference can be determined, in some cases, in a matter of a few radio frames, in some cases, one radio frame, and, in some cases, less than one radio frame. In other words, the interference pattern determined at the radio frame level is considered in order to allow a potential reason for the detected interference to be determined by network node 42. Further, the method and process describe herein are applicable to any TDD air interference including LTE TDD and LTE advanced air interferences. Further, the disclosure advantageously provides for analysis of the potential reason of the detected interference using topology based information from neighboring network nodes 42 in order to determine a root cause of the interference. In one embodiment, the interference patterns may be analyzed down to the sector of each network node 42 to pin point the offending sector of network node 42, e.g., S1 of network node 42a is the offending sector in the example discussed above with respect to Block S124.

Further, the disclosure advantageously describes DL receiver 66 that may be added to the radios of network node 42 in order to improve the accuracy of interference detection and correction. For example, DL receiver 66 may extract timing related information (such as time reference and time switch configuration) from the downlink channels of its neighbor network nodes 42. With this information, system 40 provides a monitoring capability at the network level for time alignment and TDD mode setting corrective actions.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the disclosure is not limited to what has been particularly shown and described herein above. In addition, unless mention was made above to the contrary, it should be noted that all of the accompanying drawings are not to scale. A variety of modifications and variations are possible in light of the above teachings, which is limited only by the following claims.

What is claimed is:

1. A network node for a Time Division Duplex, TDD, network, the network node comprising a processor and a memory, the memory containing instructions that when executed by the processor, cause the processor to:
   store a plurality of interference patterns corresponding to a plurality of potential reasons for interference, the plurality of potential reasons for interference including at least time misalignment and mode misconfiguration;
   detect an interference pattern caused by a first neighbor network node in at least one uplink, UL, subframe; and
   determine one of a plurality of potential reasons for the interference caused by the first neighbor network node based on matching the detected interference pattern with one of the plurality of stored interference patterns.

2. The network node of claim 1, wherein the detected interference pattern is downlink, DL, signal based interference caused by the first neighbor network node.

3. The network node of claim 2, wherein the detected interference pattern occurs within a plurality of UL subframes.

4. The network node of claim 3, wherein the determined one of the plurality of potential reasons for the interference is a time misalignment between the network node and the first neighbor network node.

5. The network node of claim 4, wherein the network node is in communication with a plurality of neighbor network nodes including the first neighbor network node;
   the memory containing further instructions executable by the processor, the network node configured to:
   receive interference information from the plurality of neighbor network nodes; and
   determine a root cause of the detected interference pattern to be time misalignment and one of the network node and one of the plurality of neighbor network nodes that is associated with the root cause of the detected interference pattern based on the received interference information and the determined one of the plurality of potential reasons for the interference caused by the first neighbor network node.

6. The network node of claim 5, wherein the memory further contains instructions executable by the processor, the network node configured to:
   determine a corrective action to address the determined root cause of the detected interference pattern due to time misalignment; and
   one of perform the corrective action and instruct the determined one of the plurality of neighbor network nodes that are associated with the root cause of the detected interference pattern to perform the determined corrective action.

7. The network node of claim 2, wherein the detected interference pattern occurs in a plurality of UL subframes.

8. The network node of claim 7, wherein the determined one of the plurality of potential reasons for the interference is a time misalignment between the network node and the first neighbor network node.

9. The network node of claim 8, wherein the network node is in communication with a plurality of neighbor network nodes including the first neighbor network node;
   the memory further containing instructions executable by the processor, the network node configured to:
   receive interference information from the plurality of neighbor network nodes; and
   determine a root cause of the detected interference pattern to be time misalignment and one of the network node and one of the plurality of neighbor network nodes that is associated with the root cause of the detected interference pattern based on the received interference information and the determined one of the plurality of potential reasons for the interference caused by the first neighbor network node.

10. The network node of claim 9, wherein the memory further contains instructions executable by the processor, the network node configured to:
    determine a corrective action to address the determined root cause of the detected interference pattern due to time misalignment; and
    one of perform the corrective action and instruct the determined one of the plurality of neighbor network nodes that is the root cause of the detected interference pattern to perform the determined corrective action.

11. The network node of claim 2, wherein the detected interference pattern occurs within a plurality of UL subframes; and
    at least one of the plurality of interference patterns being associated with a respective TDD mode configuration of the network node.

12. The network node of claim 11, wherein at least one of the plurality of interference patterns is associated with a respective TDD mode configuration of the first neighbor network node.

13. The network node of claim 11, wherein the determined one of the plurality of potential reasons for the interference is a TDD mode misconfiguration between the network node and the first neighbor network node.

14. The network node of claim 11, wherein the network node is in communication with a plurality of neighbor network nodes including the first neighbor network node;
    the memory further containing instructions executable by the processor, the network node configured to:
    receive interference information from the plurality of neighbor network nodes; and
    determine a root cause of the detected interference pattern to be TDD mode configuration and one of the network node and one of the plurality of neighbor network nodes that is associated with the root cause of the detected interference pattern based on the received interference information and the determined one of the plurality of potential reasons for the interference caused by the first neighbor network node.

15. The network node of claim 14, wherein the memory further contains instructions executable by the processor, the network node configured to:
   determine a corrective action to address the determined root cause of the detected interference pattern; and
   one of perform the corrective action and instruct the determined one of the plurality of neighbor network nodes that is the root cause of the detected interference pattern due to time misalignment to perform the determined corrective action.

16. The network node of claim 1, wherein the memory further contains instructions executable by the processor, the network node configured to:
   communicate the determined one of the plurality of potential reasons for the interference caused by the first neighbor network node to a network management system, NMS, for further analysis; and
   receive a correction action to perform to address the detected interference pattern.

17. A system, the system comprising:
   a plurality of network nodes for operating in a Time Division Duplex, TDD, network, the plurality of network nodes including at least a network node and a first neighbor network node, the network node including a node processor (68) and node memory, the node memory containing instructions that, when executed by the node processor, causes the node processor to:
   store a plurality of interference patterns corresponding to a plurality of potential reasons for interference, the plurality of potential reasons for interference including at least time misalignment and mode misconfiguration;
   detect an interference pattern caused by the first neighbor network node in at least one uplink, UL, subframe; and
   determine one of a plurality of potential reasons for the interference caused by the first neighbor network node based on matching the detected interference pattern with one of the plurality of stored interference patterns.

18. The system of claim 17, wherein the plurality of network nodes includes a plurality of neighbor network nodes including the first neighbor network node;
   the system further comprising a network management system, NMS, in communication with the plurality of network nodes, the NMS including an NMS processor and a NMS memory, the NMS memory containing instructions executable by the NMS processor, the NMS is configured to:
   receive the determined one of the plurality of potential reasons for the interference from the network node;
   receive interference information from at least one of the plurality of neighbor network nodes; and
   determine a root cause of the detected interference pattern and one of the plurality of network nodes that is associated with the root cause of the detected interference pattern based on the received determined one of the plurality of potential reasons for the interference from the network node and the received interference information from the at least one of the plurality of neighbor network nodes.

19. The system of claim 18, wherein the NMS memory further includes instructions executable by the NMS processor, the NMS is configured to:
   determine a corrective action to address the root cause of the detected interference pattern; and
   instruct the determined one of the plurality of network nodes that is associated with the root cause of the detected interference pattern to perform the determined corrective action.

20. The system of claim 17, wherein the detected interference pattern is downlink, DL, signal based interference caused by the first neighbor network node.

21. The system of claim 20, wherein the detected interference pattern occurs within a plurality of UL subframes.

22. The system of claim 21, wherein the determined one of the plurality of potential reasons for the interference is a time misalignment between the network node and the first neighbor network node.

23. The system of claim 22, wherein the plurality of network nodes includes a plurality of neighbor network nodes including the first neighbor network node, the network node being in communication with the plurality of neighbor network nodes;
   the node memory further containing instructions executable by the node processor, the network node configured to:
   receive interference information from the plurality of neighbor network nodes; and
   determine a root cause of the detected interference pattern to be time misalignment and one of the network node and one of the plurality of neighbor network nodes that is associated with the root cause of the detected interference pattern based on the received interference information and the determined one of the plurality of potential reasons for the interference caused by the first neighbor network node.

24. The system of claim 23, wherein the node memory further contains instructions executable by the node processor, the network node configured to:
   determine a corrective action to address the determined root cause of the detected interference pattern due to time misalignment; and
   one of perform the corrective action and instruct the determined one of the plurality of neighbor network nodes that is the root cause of the detected interference pattern to perform the determined corrective action.

25. The system of claim 20, wherein the detected interference pattern corresponds to an interference pattern occurring in a plurality of UL subframes.

26. The system of claim 25, wherein the determined one of the plurality of potential reasons for the interference is a time misalignment between the network node and the first neighbor network node.

27. The system of claim 26, wherein the plurality of network nodes includes a plurality of neighbor network nodes including the first neighbor network node, the network node being in communication with the plurality of neighbor network nodes;
   the node memory containing further instructions executable by the node processor, the network node configured to:
   receive interference information from the plurality of neighbor network nodes; and
   determine a root cause of the detected interference pattern to be time misalignment and one of the network node and one of the plurality of neighbor network nodes that is associated with the root cause of the detected interference pattern based on the received interference information and the determined one of the plurality of potential reasons for the interference caused by the first neighbor network node.

28. The system of claim 27, wherein the node memory further contains instructions executable by the node processor, the network node configured to:
  determine a corrective action to address the determined root cause of the detected interference pattern due to time misalignment; and
  one of perform the corrective action and instruct the determined one of the plurality of neighbor network nodes that is the root cause of the detected interference pattern to perform the determined corrective action.

29. The system of claim 20, wherein the detected interference pattern occurs within a plurality of UL subframes at least one of the plurality of interference patterns being associated with a respective TDD mode configuration of the network node.

30. The system of claim 29, wherein at least one of the plurality of interference patterns is associated with a respective TDD mode configuration of the first neighbor network node.

31. The system of claim 29, wherein the determined one of the plurality of potential reasons for the interference is a mode misconfiguration between the network node and the first neighbor network node, the mode misconfiguration being TDD mode misconfiguration.

32. The system of claim 29, wherein the plurality of network nodes includes a plurality of neighbor network nodes including the first neighbor network node, the network node being in communication with the plurality of neighbor network nodes;
  the node memory further containing instructions executable by the node processor, the network node configured to:
  receive interference information from the plurality of neighbor network nodes; and
  determine a root cause of the detected interference pattern to be a TDD mode misconfiguration and one of the network node and one of the plurality of neighbor network nodes that is associated with the root cause of the detected interference pattern based on the received interference information and the determined one of the plurality of potential reasons for the interference caused by the first neighbor network node, the mode misconfiguration being TDD mode misconfiguration.

33. The system of claim 32, wherein the node memory further contains instructions executable by the node processor, the network node configured to:
  determine a corrective action to address the determined root cause of the detected interference pattern due to the TDD mode misconfiguration; and
  one of perform the corrective action and instruct the determined one of the plurality of neighbor network nodes that is the root cause of the detected interference pattern to perform the determined corrective action.

34. A method for a network node in a Time Division Duplex, TDD, network, the method comprising:
  storing a plurality of interference patterns corresponding to a plurality of potential reasons for interference, the plurality of potential reasons for interference including at least time misalignment and mode misconfiguration;
  detecting an interference pattern caused by a first neighbor network node in at least one uplink, UL, subframe; and
  determining one of a plurality of potential reasons for the interference caused by the first neighbor network node based on matching the detected interference pattern with one of the plurality of stored interference patterns.

35. The method of claim 34, wherein the detected interference pattern is downlink, DL, signal based interference caused by the first neighbor network node.

36. The method of claim 35, wherein the detected interference pattern occurs within a plurality of UL subframes.

37. The method of claim 36, wherein the determined one of the plurality of potential reasons for the interference is time misalignment between the network node and the first neighbor network node.

38. The method of claim 37, wherein the network node is in communication with a plurality of neighbor network nodes including the first neighbor network node;
  the method further comprising:
  receiving interference information from the plurality of neighbor network node; and
  determine a root cause of the detected interference pattern to be time misalignment and one of the network node and one of the plurality of neighbor network nodes that is associated with the root cause of the detected interference pattern based on the received interference information and the determined one of the plurality of potential reasons for the interference caused by the first neighbor network node.

39. The method of claim 38, further comprising:
  determining a corrective action to address the determined root cause of the detected interference pattern due to time misalignment; and
  one of performing the corrective action and instructing the determined one of the plurality of neighbor network nodes that is associated with the root cause of the detected interference pattern to perform the determined corrective action.

40. The method of claim 35, wherein the detected interference pattern occurs in a plurality of UL subframes.

41. The method of claim 40, wherein the determined one of the plurality of potential reasons for the interference is time misalignment between the network node and the first neighbor network node.

42. The method of claim 41, wherein the network node is in communication with a plurality of neighbor network nodes including the first neighbor network node;
  the method further comprising:
  receiving interference information from the plurality of neighbor network nodes; and
  determine a root cause of the detected interference pattern to be time misalignment and one of the network node and one of the plurality of neighbor network nodes that is associated with the root cause of the detected interference pattern based on the received interference information and the determined one of the plurality of potential reasons for the interference caused by the first neighbor network node.

43. The method of claim 42, further comprising:
  determining a corrective action to address the determined root cause of the detected interference pattern due to time misalignment; and
  one of performing the corrective action and instructing the determined one of the plurality of neighbor network nodes that is associated with the root cause of the detected interference pattern to perform the determined corrective action.

44. The method of claim 35, wherein the detected interference pattern occurs within a plurality of UL subframes; and
  at least one of the plurality of interference patterns being associated with a respective TDD mode configuration of the network node.

45. The method of claim 44, wherein at least one of the plurality of interference patterns is associated with a respective TDD mode configuration of the first neighbor network node.

46. The method of claim 44, wherein the determined one of the plurality of potential reasons for the interference is mode misconfiguration between the network node and the neighbor network node.

47. The method of claim 44, wherein the network node is in communication with a plurality of neighbor network nodes including the first neighbor network node;
the method further comprising:
receiving interference information from the plurality of neighbor network nodes; and
determine a root cause of the detected interference pattern to be a mode misconfiguration and one of the network node and one of the plurality of neighbor network nodes that is associated with the root cause of the detected interference pattern based on the received interference information and the determined one of the plurality of potential reasons for the interference caused by the first neighbor network node, the mode misconfiguration being TDD mode misconfiguration.

48. The method of claim 47, further comprising:
determining a corrective action to address the determined root cause of the detected interference pattern due to the TDD mode misconfiguration; and
one of performing the corrective action and instructing the determined one of the plurality of neighbor network nodes that is associated with the root cause of the detected interference pattern to perform the determined corrective action.

49. The method of claim 34, further comprising:
communicating the determined potential reason for the interference caused by the first neighbor network node to a network management system, NMS, for further analysis; and
receiving a correction action to perform to address the detected interference pattern.

50. A network node for a Time Division Duplex, TDD, network, the network node comprising an interference detection circuit configured to:
store a plurality of interference patterns corresponding to a plurality of potential reasons for interference, the plurality of potential reasons for interference including at least time misalignment and mode misconfiguration;
determine an interference pattern caused by a first neighbor network node in at least one uplink, UL, subframe has been detected; and
determine one of a plurality of potential reasons for the interference caused by the first neighbor network node based on matching the detected interference pattern with one of the plurality of stored interference patterns.

* * * * *